United States Patent [19]
Reeve et al.

[11] Patent Number: 4,864,532
[45] Date of Patent: Sep. 5, 1989

[54] SMALL COMPUTER SYSTEMS INTERFACE—DATA LINK PROCESSOR

[75] Inventors: Jeffrey T. Reeve, Fullerton; Rangaswamy P. Giridhar, Mission Viejo, both of Calif.

[73] Assignee: Unisys Corporation, Blue Bell, Pa.

[21] Appl. No.: 99,448

[22] Filed: Sep. 21, 1987

[51] Int. Cl.⁴ .................................................. G06F 1/00
[52] U.S. Cl. .................................. 364/900; 364/939.3; 364/926.9
[58] Field of Search ... 364/200 MS File, 900 MS File

[56] References Cited

U.S. PATENT DOCUMENTS

| | | | |
|---|---|---|---|
| 4,136,399 | 1/1979 | Chan et al. | 364/900 |
| 4,298,958 | 11/1981 | Takaki et al. | 364/900 |
| 4,471,457 | 9/1984 | Videki, II | 364/900 |
| 4,542,457 | 9/1985 | Mortensen et al. | 364/200 |
| 4,613,954 | 9/1986 | Sheth | 364/900 |
| 4,644,463 | 2/1987 | Hotchkin et al. | 364/200 |
| 4,754,399 | 6/1988 | Yamamoto et al. | 364/200 |
| 4,783,730 | 11/1988 | Fischer | 364/200 |
| 4,821,170 | 4/1989 | Bernick et al. | 364/200 |

Primary Examiner—Eddie P. Chan
Assistant Examiner—Rebecca L. Rudolph
Attorney, Agent, or Firm—Alfred W. Kozak; Nathan Cass; Robert S. Bramson

[57] ABSTRACT

A peripheral controller executes data transfer operations between a host computer and a multiple number of separate peripheral terminal units. A specialized buffer memory control system provides dedicated page-segments for each one of the peripheral terminal units to enable the peripheral controller to concurrently manage a multiple number of data transfer cycles in an optimum fashion in order to increase the through-put of the data transfer operations.

11 Claims, 4 Drawing Sheets

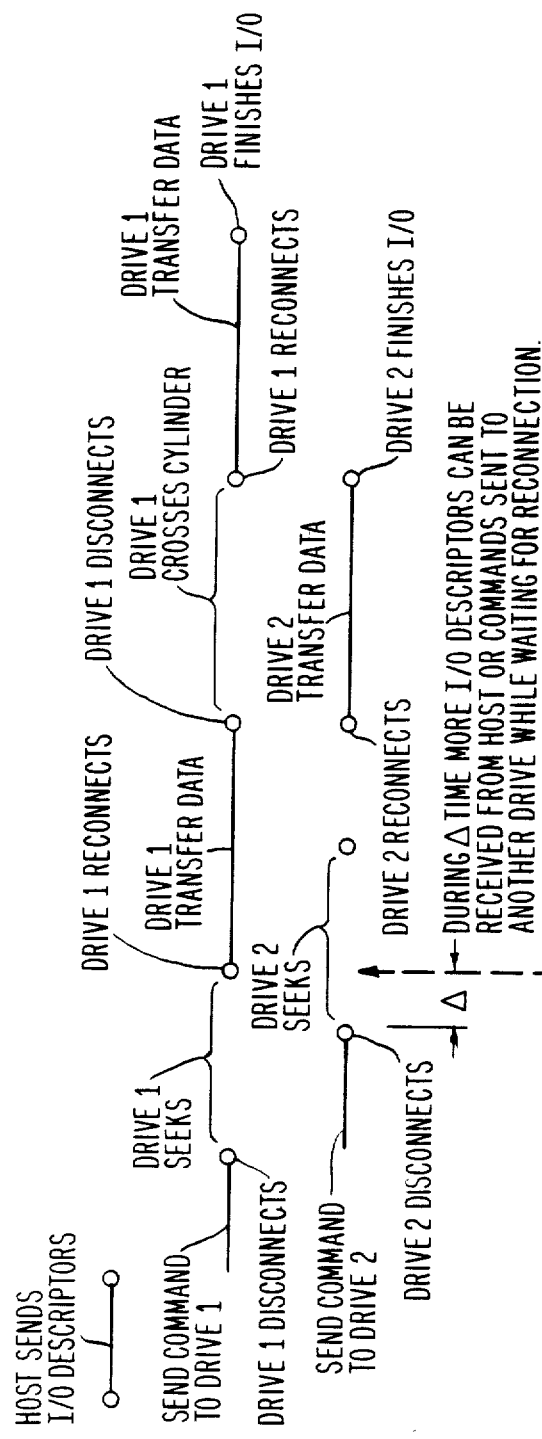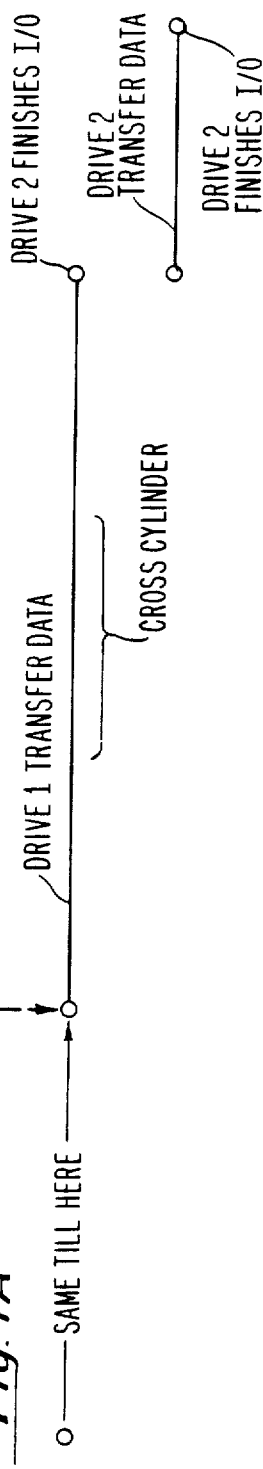
Fig. 4B
Fig. 4A

SMALL COMPUTER SYSTEMS INTERFACE—DATA LINK PROCESSOR

FIELD OF THE INVENTION

This disclosure relates to the field of peripheral controllers whereby data may be efficiently transferred between a host computer system and a multiplicity of peripheral terminal devices.

BACKGROUND OF THE INVENTION

It is the constant endeavor in computer system networks to increase the throughput or rate of data transfer between a host computer and various peripheral devices by use of an efficient I/O controller which is used to manage these data transfer operations.

It has been characteristic of many prior I/O controllers that they could only execute one particular data transfer command cycle to completion before commencement of a second data transfer command cycle operation. In a busy system where multiple peripheral units demand attention from the host computer, there were often delay periods before a requesting peripheral unit could manage to get service of the host or where the host was delayed in accessing the I/O controller to execute data transfers to a selected peripheral unit. By reducing the time delays which prior systems involved, the present I/O controller, designated as the Small Computer System Interface—Data Link Processor, operates to minimize these time delays and increase throughput.

Peripheral controllers of the type to be described herein have had various of their aspects discussed in prior United States patents. Examples of these will be found in U.S. Pat. No. 4,280,193 entitled "Data Link Processor for a Magnetic Tape Data Transfer System"; U.S. Pat. No. 4,613,954 entitled "Block Counter System to Monitor Data Transfers"; and U.S. Pat. No. 4,644,463 entitled "System for Regulating Data Transfer Operations"; U.S. Pat. No. 4,542,457 entitled "Burst Mode Data Block Transfer System"; and U.S. Pat. No. 4,607,348 entitled "Transfer Rate Control System From Tape Peripheral to Buffer Memory of Peripheral Controller". These patents form a background and description of many of the elements and operational functions which go to make up the type of peripheral-controllers which are called "data link processors", and these references are deemed to be included herein by reference.

SUMMARY OF THE INVENTION

The present disclosure provides a peripheral controller, often designated as a data link processor (DLP) which provides for the control and execution of data transfers between a main host computer and a multiplicity of peripheral devices, which may be as many as seven peripheral devices. The data link processor enables data transfer operations to occur very rapidly with large blocks of data being transferred from the host computer system to a selected target peripheral device or from a selected target peripheral device to the main host system. Part of the sequence of operations provides for the temporary storage of data being transferred, by temporarily holding it in a segmented RAM buffered memory.

The segmented buffered memory provides a separate section for data storage of data which is being transferred either to or from each one of the particular group of peripheral devices.

Since there is only one main host computer to be available for data transfer operations with seven peripheral devices, the main host computer must share its time availability in separate segments of time with each of the seven peripheral devices.

In order to speed the general overall throughput, the present peripheral controller is organized so that a selected peripheral device may disconnect itself from the data link processor while it is doing its own internal housekeeping and searching, and thus make the host system and the data link processor available for talking to and initiating data transfer operations with any other of the peripheral terminal devices.

Thus, during the time when a peripheral device is unable to receive or transmit data, that unusable time period can then be devoted to data transfers and command instructions involved with other of the peripheral devices, thus saving any times wastage for ineffectual purposes.

While many of the older forms of peripheral controllers could only devote a selected period of time to one particular peripheral device for data transfer and after that data transfer operation was completed could only then transfer its attention to another peripheral device for data transfers, the present system permits a simultaneous and parallel set of operations whereby the data link processor permits the host computer to share, in an effective manner, data transfer channels so that rapid data transfer operations can always be occurring with one or another of the peripheral devices while previously initiated peripheral devices are concerned with their internal housekeeping and are not ready to receive or transmit data with the data link processor.

This disclosure also provides the architecture for an addressing control system for a segmented buffer memory which has dedicated portions for each one of a number of peripheral terminal units. The system enables multiple numbers of data transfer cycle operations to be executed concurrently toward the process of completion amongst each of the multiple terminal units since each incomplete initiated data transfer operation will be logged with its status in a separate unit-queue segment of the buffer memory means so that, at some optimum period of time, the incomplete data transfer operation can be located and picked up at the point where it had left off in its incomplete cycle of transfer. Then the final completion of the data transfer of a block of data to and from a selected peripheral can be followed through to final completion.

Since data-in-transit between a host computer and a selected one of multiple peripheral terminal units can be temporarily stored in a dedicated segment of the buffer memory means, the microprocessor of the peripheral-controller can select those optimum time moments to finish off and complete any one of a group of initiated data transfer cycles which had been commenced.

BRIEF DESCRIPTION OF THE DRAWINGS

FIG. 4 is a schematic diagram similar to a flow chart for illustrating how simultaneous data control and data transfer operations can occur among one or more peripheral devices so as to eliminate the ineffectual time periods when no data transfer is possible. FIG. 4A shows the sequential operation of past types of peripheral controllers while FIG. 4B indicates the overlapping simultaneity which is possible under the presently disclosed system.

GENERAL OVERVIEW

This disclosure describes a particular type of small computer systems interface—data link processor (SCSI-DLP) or peripheral controller which controls information transfer between a host computer system and certain compatible target devices, such peripherals as magnetic disks or streamer tape units.

The SCSI-DLP can be built on one printed circuit card and used to control the host-DLP communication as well as the communication on a SCSI bus which attaches to seven target devices or peripherals.

The SCSI-DLP is subsequently referred to as the data link processor or DLP. The target devices or peripherals are sometimes referred to as the disk unit or the tape unit.

The particular peripheral controller discussed herein and called the small computer systems interface—data link processor is compatible with certain types of host systems which conform to Burroughs (now Unisys Corporation) mainframes which use a special interface called a message level interface or MLI which uses a specialized protocol for communications between the main host computer system and the data link processor.

The data link processor provides the necessary logic and control to communicate with the host system via the message level interface and also to communicate with the remote devices or peripherals via the SCSI interface. The DLP can be made to communicate with a maximum of seven peripheral target devices by means of the SCSI bus.

Figure 3:
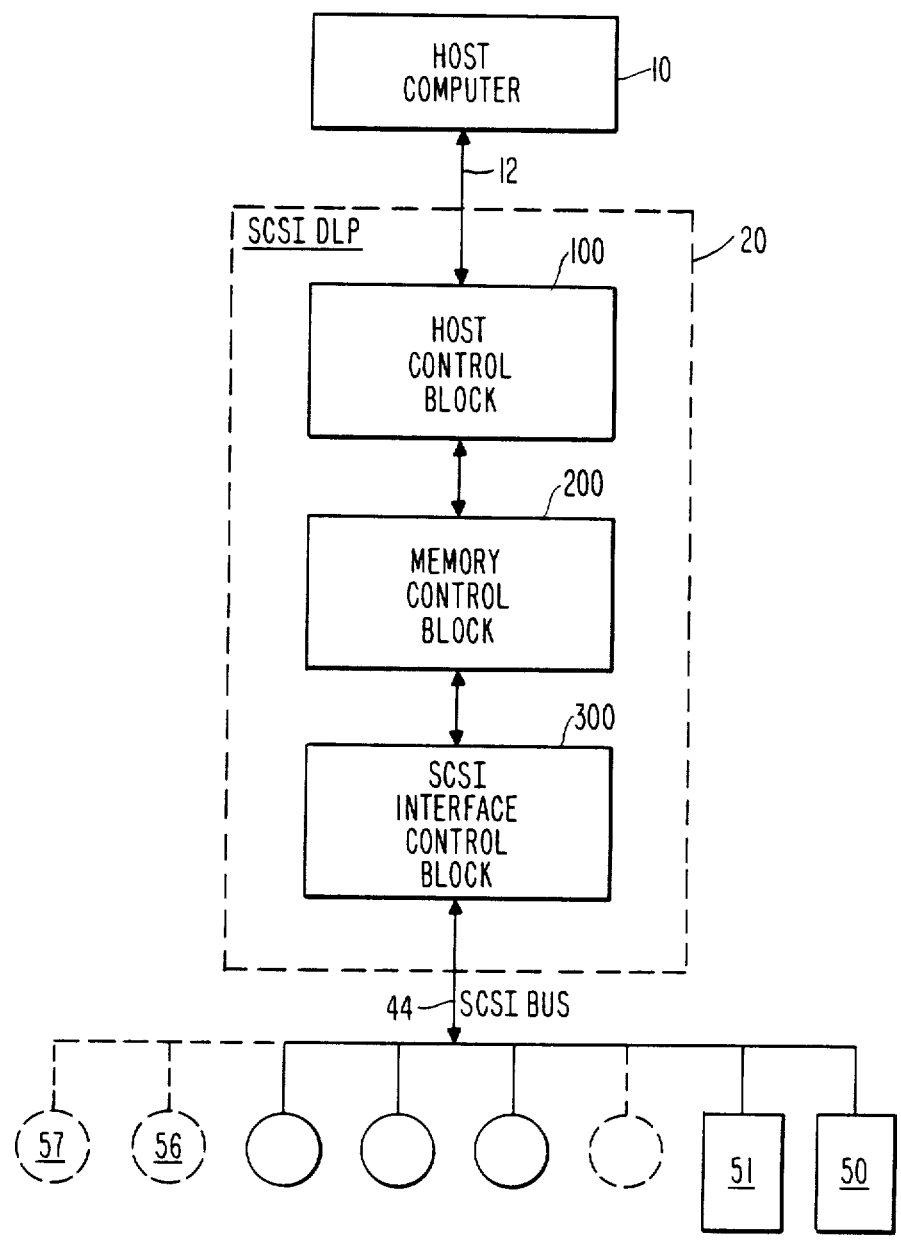
FIG. 3 is a generalized block diagram of the overall system for data transfer between a host computer and selected peripheral devices.

As described in previous patents involving these types of data link processors, the data link processor acts upon I/O descriptors (instructional commands) sent to it from the host computer system. Thus, as seen in FIG. 3, the host computer 10 may provide I/O descriptors to the data link processor 20. The data link processor (DLP) interprets the operation specified by the OP code of the I/O descriptor and performs the operation by issuing one or more commands to the terminal device. At the completion of the operation, the DLP 20 generates a resultant descriptor which is returned to the host computer 10 in order to indicate the completion/incompletion or status of that particular data transfer operation.

The data link processor 20 is a multiple descriptor unit which queues one I/O descriptor for each peripheral terminal unit. Each time the host system 10 disconnects from the data link processor 20, the data link processor will begin processing its queue 24Q, FIG. 2, in a sequential manner, beginning with a device sequentially following the last device which had been processed in order to operate as a circular queue.

The basics of operation of these type data link processors have been described in certain prior patents involving similar types of data transfer operations. One example of these prior publications is U.S. Pat. No. 4,280,193 entitled "Data Link Processor for Magnetic Tape Data Transfer System" which described one type of peripheral controller of data link processor for controlling data transfer operations. Another prior patent was U.S. Pat. No. 4,644,463 entitled "System for Regulating Data Transfer Operations" which further described a similar type of data link processor and the use of peripheral address registers and system address registers for controlling the data transfer operations between a main host computer and a peripheral device. These patents, which are all commonly owned by the same assignee, are included herein by reference in this disclosure, which is also owned by the same assignee.

Three-Port Memory Scheme: The particular memory architecture involved here gives the SCSI-DLP a three-port memory arrangement consisting of eight pages of 1024 bytes per page (one kilobyte), each of which pages is addressable by three different memory address registers. This provides for an efficient operation whereby it allows data transfers to take place in any one of pages 0–6 via the S register and the P register (address registers), while the status of any transfer can be updated in page 7 (the eighth segment of the buffer memory 24) with the use of a scratch pad (SPAD 30) address register acting independent of the S and the P registers.

A considerable feature of this architectural implementation is that up to seven separate data transfers can be in progress at any given time without having to flush and empty the entire buffer memory of data before having to start the next data transfer operation to/from the host. Because of this arrangement with dedicated segments, a considerably higher level of data throughput is made possible.

To initiate an operation, the host computer 10 sends the DLP 20 an I/O descriptor and a descriptor link which identifies the particular operation which was instructed. The I/O descriptor itself specifies the operation to be performed.

After reception of the I/O descriptor link, the DLP 20 will make a transition to one of the following massage level interface "states" with respect to the host computer 10:

RESULT DESCRIPTOR: This state transition indicates that the data link processor is immediately returning a result descriptor to the host to indicate completion of some cycle, incomplete cycle or some error that was detected.

DISCONNECT: This state transition indicates that the data link processor cannot accept any more operations at this time and that the I/O descriptor and the descriptor link were received by the DLP without parity errors.

IDLE: This state transition indicates that the data link processor can accept another legal operational command at this time and that the previous I/O descriptor and the descriptor link were received by the DLP without parity errors.

Upon completion of a commanded operation, the DLP 20 constructs a result descriptor from information supplied by the peripheral device as well as internal flags within the data link processor. This information is returned by the DLP to the host computer 10.

The data link processor used in the present disclosure uses a segmented data buffer memory 24. The DLP data buffer memory 24 is divided into 15 parts as will be discussed in connection with FIG. 2. The most significant 512 words are used as a scratch pad to store "queue" information and unit-related information because of an inquiry from a target peripheral or from a sense command to a target peripheral. The "queue" section is the fifteenth part of the memory. The remaining buffer area is divided into seven pages of 512 words each and whereby each page can hold two separate blocks of 256 words each. These two blocks in an given page are reserved for data storage in connection with each target device or peripheral unit.

With respect to data transmission between the DLP 20 and the host 10, data will be transferred one buffer (512 bytes) at a time followed by a longitudinal parity word. The DLP 20 is "word-oriented" where one word equals sixteen bits plus parity.

On a "read" operation, the data link processor will send all available data in the buffer segments to the host computer system 10 and then disconnect itself from the host computer.

On a "write" operation, blocks of data are sent from the host computer 10 for temporary storage in the memory buffer 24, until the data is subsequently transferred to a selected peripheral unit.

DLP-Peripheral Terminal Communications: The data link processor 20 communicates with the selected peripheral device by setting up certain types of phases in the SCSI bus 44.

(i) Bus-Free Phase: This phase is used to indicate that no peripheral device is actively using the bus 44 and that the bus 44 is available for the DLP 20 to start the sequence. The DLP will detect a "bus-free" situation by monitoring control signals to determine when the bus 44 is freely available.

(ii) Arbitration Phase: During this phase, the DLP 20 gains control of the SCSI bus 44 in order to assume the role of an initiator.

(iii) Selection/Reselection Phase: During this phase, the DLP 20 selects a peripheral device for the purpose of initiating an operation. During "reselection", the peripheral device reconnects to the data link processor in order to continue an operation which was previously started by the data link processor but suspended by the target peripheral device.

(iv) Information Phase: The information phase may be considered to involve four parts as follows (but not necessarily in the order below):

(a) Command Phase: During this phase, the DLP sends a command to be performed by the target peripheral. This command is made up of a six or a ten byte command block.

(b) Data Phase: For a "data-in" phase, the DLP 20 receives data from the peripheral device. During the "data-out" phase, this period is used by the data link processor DLP, when data is to be sent to the target peripheral device.

(c) Status Phase: During this phase, the DLP 20 receives the "status byte" from the target peripheral at the completion of an operation.

(d) Message Phase: During the "message-in" phase, the DLP 20 receives a message byte from the target peripheral device. During a "message-out" phase, the DLP 20 sends a message byte to the target peripheral.

The protocol controller 40 monitors the SCSI bus 44 and acts as a slave to the connected peripheral unit to receive information identifying the particular phase involved. A phase sense register $40_{pr}$ holds this information and the protocol controller 40 provides an interrupt to the DLP 20 and informs the ALU 32 so that the proper program routine can be selected.

An example of a typically useful I/O descriptor instruction may be illustrated by use of the "read device buffer" instruction and then also the "write DLP buffer".

Read Device Buffer: This operation causes the DLP 20 transfer up to 65,636 bytes of data from the target peripheral to the host computer 10. The read device buffer is used in conjunction with the "write device" buffer command as a diagnostic function for testing the peripheral's data buffer memory and the SCSI bus 44's integrity.

Write DLP Buffer: The "write DLP buffer" operation allows the DLP to accept up to 14 buffers (each of 3,584 MLI words) of data from the host. The data storage area for this operation is identical to the area used in the "read buffer" operation and used by the DLP for buffering all data between the host and the target peripheral. This operation is intended as a fault isolation operation to verify the host system's communication with the data link processor.

Write Data Operation: This operation causes the data link processor to transfer data to the target peripheral to be written on the medium starting at the current medium position for a tape device. A disk device will have an address specified in the I/O descriptor. The length field specifies the amount of data to be written in bytes.

Read Data Operation: This operation will cause the DLP 20 to read the data from the target peripheral and transfer it to the host system. The amount of data to be transferred is specified (in bytes) in the length field of the I/O descriptor. Again a disk device will have an address in the I/O descriptor.

DESCRIPTION OF PREFERRED EMBODIMENT

Figure 1:
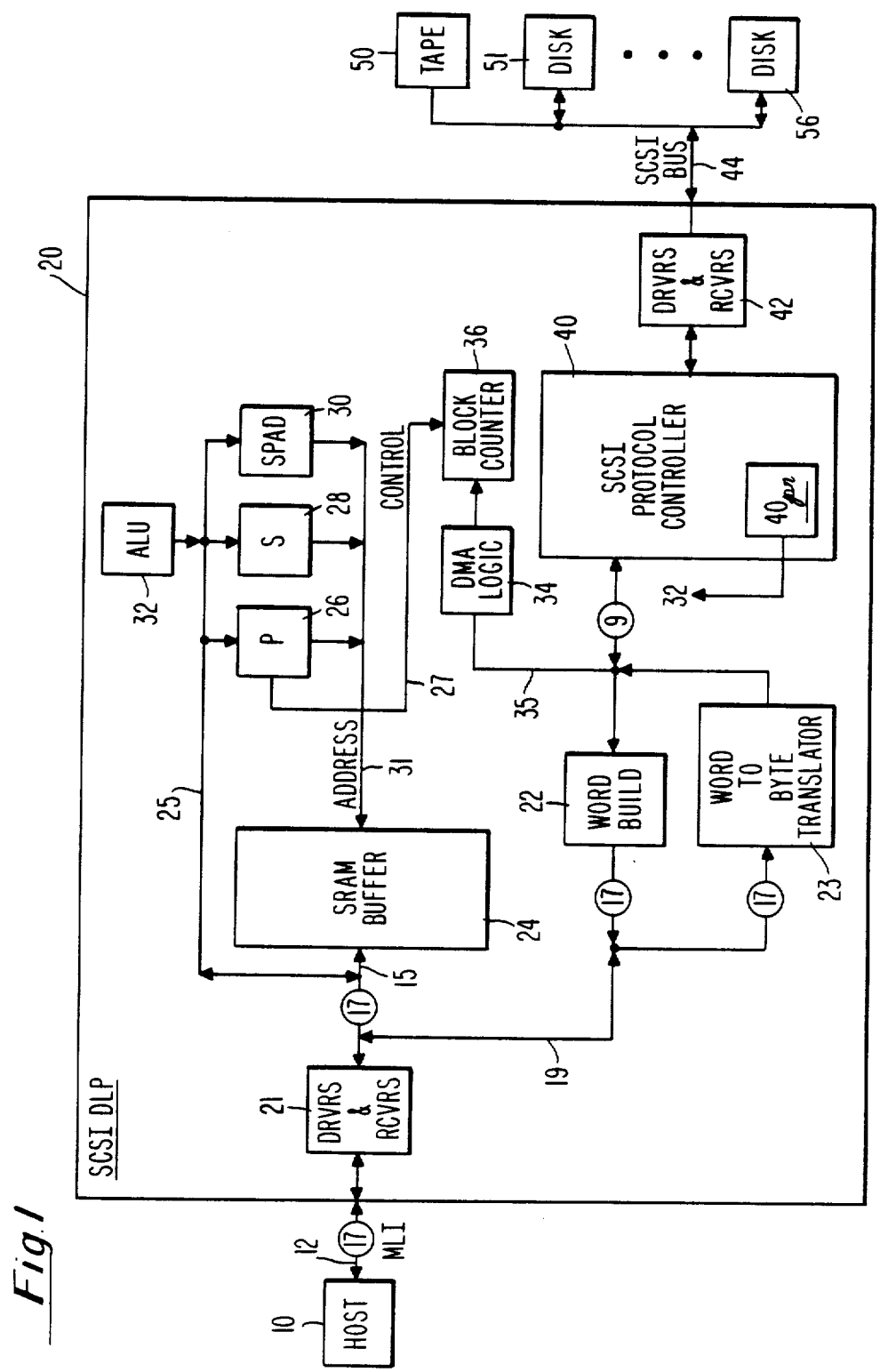
FIG. 1 is a block diagram showing the main elements of the small computer systems interface—data link processor.

Referring to FIG. 1, this is seen a block diagram of the small computer systems interface—data link processor (SCSI-DLP) 20 which basically acts as a peripheral controller for the handling of data transfer operations between a host computer 10 and a set of terminal devices such as the tape peripheral 50 and the disk peripherals 51 through 56.

The data transfers between the host computer system 10 and the drivers and receivers 21 are effectuated through a bus 12 called the message level interface (MLI) bus which provides a specialized protocol compatible with Burroughs (now Unisys Corporation) main host computers, such as the B5900, B6900, B7900 and A and V series systems.

The data transfers from the SCSI-DLP and the peripheral devices are accomplished by means of a bus 44 designated as the SCSI bus which transfers data between the drivers and receivers 42 and the terminal peripheral devices 50 through 56.

Previously issued patents such as U.S. Pat. No. 4,613,954 have disclosed the use and operation of data link processors and the use of peripheral address registers and the use of system address registers in order to address locations in a memory buffer whereby data being transferred can be temporarily stored.

For example, when data is being transferred from one of the peripheral devices 50–56, the data being transferred is temporarily placed in a buffer memory, such as the segmented RAM buffer 24 of FIG. 1. The location of storage for this data is determined by the peripheral address register such as 26 of FIG. 1 which provides the address locations (of the page segments of buffer memory 24) into which the data is to be located.

Then, at the appropriate time, this data, in the page segments, is accessed by the addresses supplied by the S address register 28 so that the data can then be transferred through the drivers-receivers 21 and on to the host computer 10 by means of the MLI bus 12. This directional flow of data from a peripheral terminal to the main host computer is called a "read" operation. As such, the principal function of the S register 28 is to provide the address locations for the data being temporarily stored in page segments for subsequent transfer to the main host computer 10.

The S register 28 is also used to provide address data for page segment locations in the SRAM buffer 24 when data transfers are to occur between the host system 10 and the buffer 24. In this case, the S address register 28 provides the page segment addresses of data to be accessed in the buffer 24 for subsequent transmittal to the host 10. Or likewise, when data is flowing from the host 10 toward the buffer 24, then the S register 28 will supply the appropriate address locations for this data to be placed in temporary storage in the appropriate page segments.

When data is being transferred from the host computer to an eventual destination in one of the peripheral units 50-56, then this is called a "write" operation and data moves from the host to the peripheral unit, but meanwhile being temporarily stored, in dedicated page segments, in the memory buffer 24 at the locations specified by the S register 28.

Thus, as seen in FIG. 1, the SCSI-DLP 20 is seen functioning with the use of a segmented RAM (SRAM) buffer 24 which has its address locations specified by the P register 26 (peripheral address register), the S register 28 (system address register), and additionaly the SPAD register 30, which can be viewed as a scratch pad address register.

An arithmetic logic unit ALU 32 operates on a bus 25 in order to transmit and receive data to and from the memory buffer 24 while at the same time providing address data to the three registers—the P register 26, the S register 28, and the SPAD register 30. These three registers then provide address data on the address bus 31 to the segmented RAM buffer 24.

Thus, in a "write" operation, the data is transmitted from the host 10 to temporarily reside in page segments in the RAM buffer 24. After this it can be retrieved and passed on to bus 19 and through the translation circuit 23 (word to byte) and thence to the protocol controller 40. The protocol controller 40 can then transmit the data on SCSI bus 44 onto the properly designated peripheral terminal such as the tape unit 50 or the disk units 51 through 56. The peripheral terminal is designated (identified) in the I/O instruction generated by the host computer 10.

In the other direction when data is being transmitted from the peripheral units to the host computer system (read operation), then the data is passed on the bus SCSI bus 44 and then via the drivers and receivers 42 into the protocol controller 4 and then into the memory buffer 24. Before, however, being transferred to the memory buffer 24, the data passes through a "word build" circuit 22 which changes the data bytes (8 bits) received from the peripherals into "words" (16 bits) which can then be placed into the buffer 24 for subsequent transmittal to the host 10.

It will be seen on FIG. 1 that a block counter circuit 36 is used to count the blocks of data which are being transferred into the buffer 24 or out of the buffer 24. This block counter 36 is placed under the control of the P register 26, so that a count is made of the number of blocks of data that have been transferred either between the host system 10 and the memory buffer 24 or as between the memory buffer 24 and the selected peripheral terminal 50 through 56.

A DMA or direct memory access logic unit 34 is provided so that a block of data can be transferred rapidly into or out of the memory buffer 24 without the need for addressing each word location in the memory buffer 24 and placing a single word in it. Rather, a whole series of addresses can be sequentially addressed and words of data sequentially placed in locations in selected page segments of the memory 24 through use of the P address register 26.

Figure 2:
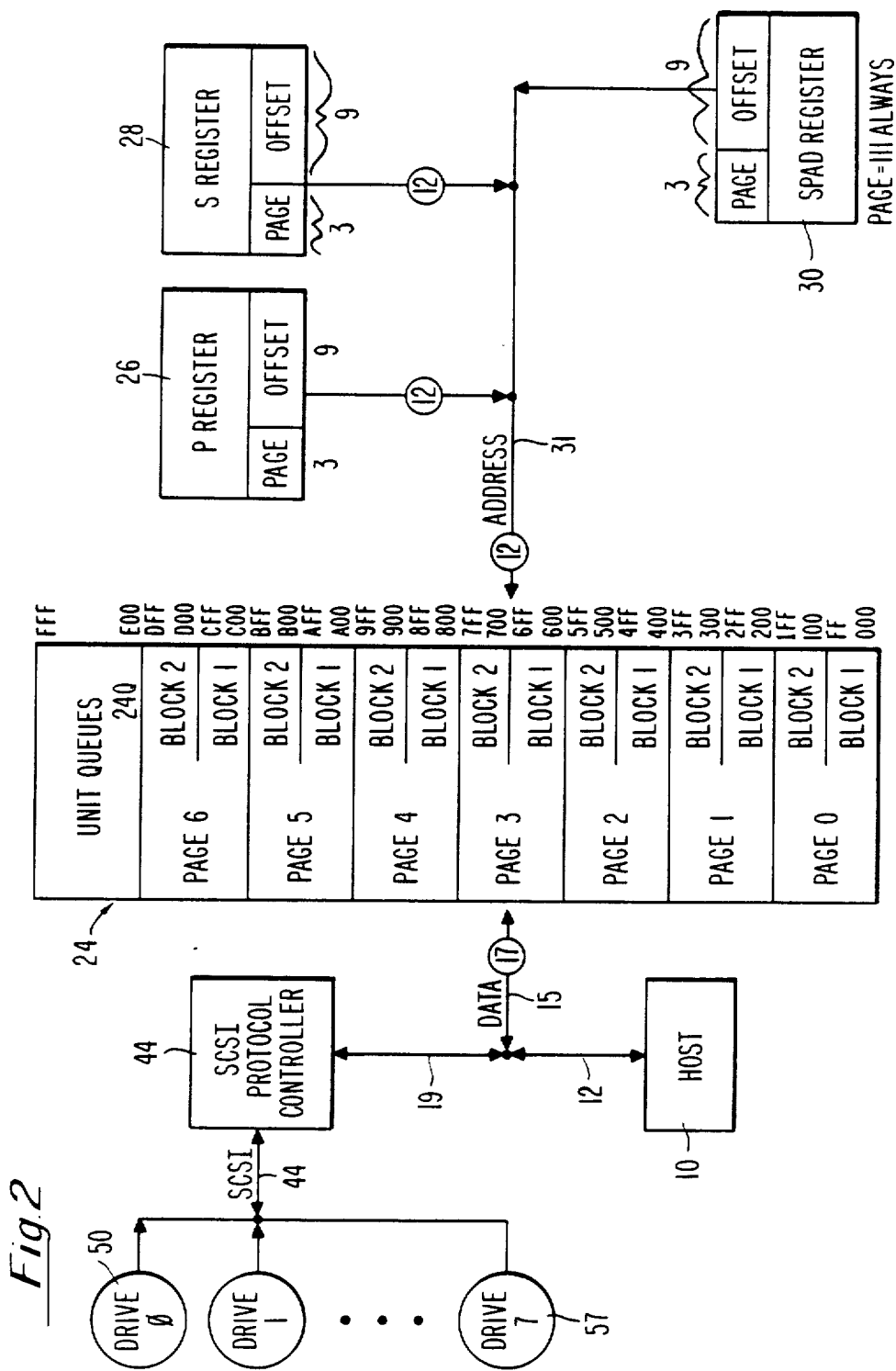
FIG. 2 is a detailed diagram of the segmented RAM buffer memory used in the data link processor together with a specialized set of address registers.

Referring to FIG. 2, there is shown a more detailed diagram of the segmented RAM buffer memory 24 and the major elements with which it cooperates.

As will be seen in FIG. 2, the segmented RAM 24 is split up into various sections, each of which is shown to have a Hex address shown at the right-hand side of the entire block unit 24.

There are seven segments in this buffer memory which are designed as page 0, page 1, page 2, etc through page 6 in order to provide seven separate memory sections which are designated as a "page segment". Additionally, there is an eighth segment which is entitled "unit queues" or scratch pad.

In order to address a particular location in the segmented buffer 24, an address is provided on bus 31. The address data can originate either from the P register 26, from the S register 28, or from the SPAD register 30 (Scratch Pad).

As seen in the registers 26, 28, and 30, each one of these registers has a 3-bit segment to denote the page followed by a 9-bit segment which determines the offset. The offset is the number of the location within the particular page involved. The scratch pad address register (SPAD) only addresses the unit queues (FIG. 2) since the page field is always 111 binary.

As seen in the memory buffer (block 24), each one of the pages is further segmented into two blocks. These are designated as block 1 and block 2. In this particular embodiment, one block is the equivalent of 256 words of data.

The actual data which is placed into the RAM buffer 24 or which is removed form the RAM buffer 24 is handled by the bus 15 as shown in FIG. 2. Thus there may be data traveling from the host 10 on to the MLI bus 12 and then on to the bus 15 in order to enter data into the RAM buffer 24. Or, in the other direction, data may be retrieved from the RAM buffer 24 and pass on bus 15 and thence on bus 12 to the host 10.

Similarly, at the peripheral terminal end, data may be transmitted from any one of the peripheral terminals 50 through 57 over the SCSI bus 44 and through the protocol controller 40, thence on to bus 19 and then via bus 15 into the memory buffer 24. Likewise, in the other direction, data may be retrieved from the memory buffer 24 and be transmitted on bus 15, through bus 19 to the protocol controller 40 and thence over the SCSI bus 44 to the designated peripheral unit in the group of elements 50-57.

Referring to FIG. 3, there is seen an abbreviated block diagram of the system network. A host computer 10 is connected for control and data transfer to a multiplicity of peripheral terminals 50 through 57. A specialized message level interface protocol bus 12 connects the host computer to the small computer systems interface—data link processor 20. The data link processor basically provides a host control block 100, a memory control block 200, and a small computer systems interface control block 300 which connects to the peripheral terminals by means of a small computer systems interface bus 44.

The host control block 100 may be said to be composed of (referring to FIG. 1) bus 12, drivers-receivers 21, bus 15, and the memory buffer 24.

The memory control block 200, referring to FIG. 1, may be considered to be composed of the P register 26, the S register 28, the SPAD register 30, the address bus 31, the ALU 32 and the bus 25, and the block counter 36.

The SCSI interface control block 300 may be considered as being composed of the SCSI bus 44, the drivers-receivers 42, the protocol controller 40, the direct memory access logic 34, the bus 35 and the bus 19, as well as the word build unit 22 and word-to-byte translator 23.

Referring to FIGS. 4A and 4B, there will be seen a time-log chart which will indicate the considerable difference between older methods of I/O processing and the newer method described in this disclosure.

Referring to FIG. 4A, there is seen a sequence of operations where past peripheral controllers (data link processors) operated in the sequential handling of data transfer operations. As will be seen in FIG. 4A, when there is a request for the disk drive 51 to transfer data to the host, the disk drive 51 will disconnect from the DLP 20 and will go into its "seek" mode where it may cross several cylinders of data in order to find the proper sector. After the proper sector of data is found, the disk drive 51 must then request a reconnection to the data link processor 20 and then wait until the connection is effectuated, after which it can then finish its I/O data transfer operation by transferring all the data from the requested sector over to the buffer memory of the data link processor. When this is done, it is only then possible for the disk drive 52 to be commanded to search for certain data and eventually transfer that data to the host. But again, the disk drive 52 must seek the required data from the appropriate sector and then wait for a reconnection to the data link processor, after which it can then continue to transfer all the data to the host by means of the buffer memory. Thus, the operation is a sequential one in which only one disk drive can be activated at any one given time.

With prior data link processors (I/O controllers), it was possible to have multiple disk drives "seeking" concurrently but they could not disconnect if they needed to cross another cylinder boundary or if they had to do housekeeping functions after data transfer operations started.

Now referring to FIG. 4B which will illustrate the sequential operations which can occur with the architectural configuration of the present disclosure. For example, the host will send an I/O descriptor (data transfer instruction) and will provide a command to the disk drive 51 to select a particular sector of data. The disk drive 51 will disconnect from the DLP and then will go through a period where the disk drive 51 seeks to acquire the data of the desired sector. Now, on the other hand, while the disk drive 51 is seeking its data, at the same time the DLP 20 can send a data transfer command to the disk drive 52 after which the disk drive 52 will disconnect and seek its required data in the appropriate sector. This, however, is occurring at the same time that the activities of disk drive 51 are also occurring.

Now, to return to the cycle of the disk drive 51, it is seen that the disk drive 51 will reconnect to the data link processor 20 and the disk drive 51 will then transfer its data, after which it will disconnect itself from the data link processor 20. Meanwhile, as soon as the disk drive 51 disconnects from the DLP, it is now possible for the disk drive 52 to reconnect to the data link processor and transfer its data and complete its I/O cycle. However, simultaneously while disk drive 52 is transferring data, it can be seen that disk drive 51 is now able to cross cylinders in seeking a new sector of data and as soon as the disk drive 52 finishes its I/O operation, the disk drive 51 will reconnect to the data link processor and transfer its data to the data link processor 20.

It could be noted here that there are several simultaneous operations occurring as between the disk drive 51 and the disk drive 52. Likewise, the segmented buffer RAM memory 24 permits the use of up to seven concurrently ongoing cycles of data transfer from the seven peripheral terminals. Thus, while any given disk drive is involved with its "seek" time (or any other housekeeping such as retries on bad sectors or relocating the bad sector or crossing a cylinder boundary), this period can profitably be used for other of the disk drives to receive commands or to transfer data back to the data link processor for eventual transfer to the host computer 10.

Thus, this juggling act permissibility makes the best use of the SCSI bus 44 since it is never idle and is continually being used for data transfer or command transfers to and from various ones of the multiple peripheral units.

Operational Functions: After the host system 10 has sent one or more I/O descriptors (instructions) to the SCSI-DLP 20, the DLP will issue a command to a selected peripheral unit from the group of terminals 50-57.

If, for example, the DLP 20 issues a "read" or "write" command to the disk drive 51, then the disk drive 51 will receive the command and then disconnect from the DLP 20 since the disk drive 51 recognizes that a period of time will be required to permit the "seek" to the requested sector in order to access the required data if the data is to be taken from the buffer 24 for transfer to the peripheral terminal 51.

Likewise, if data was to be transferred from the disk drive 51 to the DLP 20 and into the buffer 24, then again a "seek" time would be required in order to find the requested sector. When the disk drive 51 disconnects from the DLP 30, this frees up the SCSI bus 44.

It may be noted that the SCSI-DLP 20 saves the last used address of the S register 28 and the P register 26 by storing them in a dedicated scratchpad area of the unit queue (FIG. 2). Each page segment of buffer memory 24 has a unit queue scratchpad area (24Q, FIG. 2) such that there are seven scratchpad areas which could be designated $24Q_0$ through $24Q_{65}$. Each unit queue scratchpad area, 24Q, will contain (i) I/O instruction command data; (ii) I/O status information; (iii) an address pointer providing a return address for the peripheral address register (P) 26; (iv) an address pointer providing a return address for the system address register (S) 28. The scratchpad address register (SPAD) 30 is used to address the specific unit queue scratchpad area in order to get the return address pointers for insertion into either the S address register 28 or the P address register 26. The scratchpad address register (SPAD) 30 is also used to address a specific unit queue area to retrieve I/O instructions or status information required by the ALU 32.

Since the disk drive 51 is gone "seeking" on the magnetic disk in order to get the required data, and since the SCSI bus 44 is free, then the DLP 20 (data link processor) may then issue another command,—for example, a command onto the disk drive 52.

The disk drive 52 then performs analogously to that of the disk drive 51. That is to say, it receives the command from the DLP, it disconnects itself from the data link processor, the data link processor 20 then saves the last address of the system register 28 and/or the peripheral register 26, in the appropriate unit queue scratchpad area associated with a particular page segment and a particular peripheral unit.

Thus, it is quite feasible to repeat this particular process time and time again until the seven disk drives are busy seeking data simultaneously while other disk drives are receiving or transmitting data from/to the DLP 20.

Eventually, one of the disk drives will locate the requested sector of data and reconnect itself to the SCSI-DLP 20: for example, when disk drive 51 does this and reconnects to the DLP and the saved return address values (in Scratch Pad) of the system register 28 and the peripheral register 26 are retrieved from the unit queue in buffer 24 using the SPAD address register 30 for the addressing.

After reconnecting to the DLP 20, the disk drive 51 begins transferring data into "page one" of the segmented buffer 24 via the SCSI protocol controller 40.

The peripheral address register P 26 is used to address the RAM buffer 24 on the basis of a direct memory access process. After 256 words (512 bytes) have been deposited into the page one, block one, then the SCSI-DLP begins transferring data from page one, block one (FIG. 2) where one block of data is equal to 256 words,—the data being transferred to the host using the system register, S register 28, for the activity of addressing the RAM buffer 24.

Meanwhile, the disk drive 51 is still transmitting and depositing data into the segment designated page one, but now it enters into block two, which is the upper section for holding the 256 words of the first page. This occurs simultaneously with the transfer of data to the host computer 10 out of block 1 (page 1).

The SPAD address register 30 frequently addresses the unit queue portion of the segmented memory buffer 24 in order to update the status of the I/O operation in progress.

The scratch pad address register, SPAD 30, operates to play a critical role in the data transfer process. Without the SPAD register 30, the S register 28 would have to be saved, and then loaded with a unit queue address, and then would have to update the data in the queue portion of the segmented RAM buffer memory 24 and then the S register 28 would have to be reloaded with the saved value again. Obviously, this would take a considerable period of time. Thus, without the third register, the SPAD 30, cooperating with the dedicated unit queue scratchpad area, the complexity of the necessary code would increase and the system performance would decrease.

The disk drive 51 may need time to cross a "cylinder boundary" or else to perform some other time-consuming task. Therefore, the disk drive 51 disconnects from the SCSI-DLP 20, and the DLP 20 itself unit queues will save the present data pointers (the S register address and the P register address) in the appropriate scratchpad queue portion of the segmented buffer memory 24 which is addressed by the SPAD 30 (scratch pad address register).

After the disconnection process takes place, the SCSI-DLP 20 is now available to receive more I/O descriptors from the host computer 10 or else to issue a command to another disk drive—all the time while the DLP is waiting for the disk drive 51 or the disk drive 52 to reconnect itself to the DLP 20.

As another example, if the disk drive 52 has found its requested sector of data and then reconnects to the DLP (as disk drive 51 did earlier) and the disk drive 52 then begins data transfer just like disk drive 51 did, it should, however be understood that the disk drive 52 will be transferring its data into the segment known as page two of the segmented buffer memory 24 which is dedicated to the disk drive 52.

Thus, it can be seen that there are two data transfers which are in process simultaneously and at the same time.

It can be noted here that the SCSI-DLP 20 did not have to flush out the contents of the (page one) section of its remaining data before allowing the transfer of data into page 2 for the disk drive 52. This was done because the data was simply put into another page.

Thus, since there are at least seven segments or pages available in the segmented buffer memory 24, it is possible to expand this "simultaneity" or ongoing concurrency of data transfer cycles for up to seven different disk drives. Thus, multiple numbers of data transfer cycles can be concurrently in various stages of execution for a plurality of I/O commands initiated by the host computer.

Now returning to the condition where the disk drive 51 is in the process of having data transferred and the disk drive 52 is also having data transferred, it will be seen that the disk drive 52 transfers all its data to the SCSI-DLP 20 via dedicated portion of the segmented buffer memory 24 which in turn will enable the data to be transferred to the host computer 20.

After the disk drive 52 finishes up all of its data transfer operations, then the disk drive 51 will go into the previously described reconnection process and finish up its particular cycle of transferring its data to the host.

Previous designs of data link processors generally employed one contiguous buffer memory which was addressable by one or two hardware registers which were built from off-the-shelf parts. The inherent disadvantages with this approach is that any one I/O operation command transfer cycle must be completely finished before the next I/O transfer cycle can begin.

In order to circumvent this type of problem, the SCSI-DLP "segments" its particular buffer memory 24 (SRAM) into eight separate pages (segments) consisting of one kilobyte capacity per page.

This segmentation takes place in hardware through the use of programmed array logic units (PALs).

There are two memory address registers which are normally used. The S memory address register 28 is used to control and monitor data transfers from the host system into and out of the SRAM buffer memory 24 while the peripheral or P register 26 is used to control and monitor the transfer of data into and out of the buffer 24 when data transfer operations are involved with the peripheral units. Thus, either one of the memory address registers, S and P, can be used to address a single word within any one of the eight pages of memory. Thus, as seen in FIG. 2, the P register 26 has a page address segment consisting of three bits and an "offset" segment which gives the address of the word within the page. This offset portion consists of bits 0 through bit 8 and involves a total of nine bits. The page segment involves bits 9 through 11 and involves a total of three bits. Likewise, the S register 28 and the SPAD register 30 also have portions for the page segment and for the offset segment.

The lower nine bits of the address registers are incremented by the ALU 32 (of FIG. 1) to the next address by microcode or hardware, thus indicating that a data word has been transferred to the memory buffer 24 at the address prior to the incrementation of the offset segment.

The segment portion (page address) of the register does not increment, and the offset portion functions as a mod 512 counter.

If a transfer is desired to a different page, one must load the appropriate address register with the desired value and see that the entire register gets loaded with the new value. After this loading, the segment portion remains unchanged until the next load is encountered.

Complementing the S address register 28 and the P address register 26, there also exists a third or tertiary register designated as the scratch pad address register or SPAD 30. The SPAD register 30 only addresses the eighth page of memory (segment = 111). Operating just like the S register and the P register, the SPAD address register consists of an offset portion which functions just the same as those portions of the S and P registers. However, unlike the S and P register, the SPAD register 30 does not include a segment as part of its address.

There has been described herein an I/O controller for handling a multiple number of peripheral terminals in a network controlled by a type of host computer which can be used for small network systems. The I/O controller, or, as it is often called, a data link processor, permits multiple simultaneous data transfer cycles to be concurrently effectuated in a time-saving efficient fashion which substantially increases the throughput.

While a preferred embodiment has here been illustrated, it should be understood that the concept may have other implementations but which are encompassed by the following claims.

What is claimed is:

1. A peripheral controller for executing data transfer operations between a host computer and a plurality of peripheral terminal units wherein said host computer generates I/O data transfer instructions to said peripheral controller to communicate with a specified peripheral terminal unit and to initiate data transfer operations to/from said host computer via a buffer memory means having private dedicated page segments for each peripheral terminal unit, said peripheral controller comprising, in combination:

(a) host control block means for controlling data transfers between said host computer and an intermediate buffer memory storage means, said host control block means including:

(a1) a segmented buffer memory means providing private dedicated page segment locations for holding data received from/or destined toward each particular one of said plurality of peripheral terminal units, said buffer memory means including:

(a1a) unit queue means for each peripheral terminal unit, for storing data transfer instructions from said host computer and for storing address and return pointer location data indicating the number of words transferred, for any given page segment, in furtherance of an I/O data transfer instruction;

(a1b) a plurality of privately dedicated page segment locations such that each peripheral terminal is provided with its own buffer memory page segment;

(a2) bus connection means between said host computer and said host control block means;

(b) a memory control block means connected to said host control block means, for controlling data transfers into/out of said segmented buffer memory means on a concurrent basis whereby a plurality of initiated data transfer cycles are in progress simultaneously by one or more of said peripheral terminal units, said memory control block means including:

(b1) triple port address means for accessing data in said page segments and unit queue means of said buffer memory means to effectuate data transfer operations whether the data transfer operation is the original initiated instruction or is a continuance of a previously initiated data transfer instruction, said address means including:

(b1a) a peripheral address register for holding address pointer data for addressing a designated one of said buffer memory page segments for insertion or retrieval of data words being transferred between said buffer memory means and a designated peripheral terminal unit;

(b1b) a system address register for holding address pointer data for addressing a designated one of said buffer memory page segments for insertion or retrieval of data words being transferred between said buffer memory means and said host computer;

(b1c) a scratch pad address register for addressing said unit queue means, in order to permit transfer of said stored address pointer data/return pointer data into said peripheral address register/system address register so that data transfer operations can occur at the proper page segment location of said buffer memory means;

(b1d) address bus means, connecting said peripheral address register, said system address register, said scratch pad address register, to said buffer memory means for accessing addressed locations in said buffer memory means;

(b2) arithmetic logic unit processor means for executing and controlling data transfer instructions received from said host computer;

(c) peripheral interface control block means for regulating data transfers between said segmented buffer memory and a selected one of said plurality of peripheral terminal units, said peripheral interface control block means including:

(c1) interface bus means providing communication channels between each one of said plurality of peripheral terminal units and a protocol controller unit;

(c2) said protocol controller unit for controlling operation of said interface bus means and for communicating with said segmented buffer memory means;

(c3) translation means connected between said protocol controller unit and said buffer memory means for packaging transmitted data bytes into words or words into bytes to accommodate interface bus requirements.

2. The peripheral controller of claim 1 wherein said interface bus means operates, under control of said protocol controller, in four phases including:
(a) an idle phase where no data is being transferred between a peripheral terminal unit and said buffer memory means;
(b) an arbitration phase during which the said protocol controller gains control of the said interface bus means;
(c) a selection phase where the said protocol controller selects a designated peripheral terminal unit specified by the I/O instruction;
(d) an information transfer phase during which data words, status words or message words are transferred between said designated peripheral terminal unit and said buffer memory means.

3. The peripheral controller of claim 1 wherein said protocol controller unit includes:
(a) means to inform said processor means that the system bus means is available for use.

4. The peripheral controller of claim 1 wherein said protocol controller unit includes:
(a) means to enable said arithmetic logic unit processor means to connect to a selected peripheral terminal unit.

5. The peripheral controller of claim 1 wherein said protocol controller unit includes:
(a) means to enable said arithmetic logic unit processor means to transmit an instruction command to said selected peripheral terminal unit.

6. The peripheral controller of claim 1 wherein said protocol controller unit includes:
(a) means to enable said system bus means for transferring data from said segmented buffer memory to said selected peripheral terminal unit.

7. The peripheral controller of claim 1 wherein said protocol controller unit includes:
(a) means to enable said system bus means for transferring data from said selected peripheral terminal unit to said segmented buffer memory.

8. The peripheral controller of claim 1 wherein said peripheral interface control block means includes:
(a) block counter means controlled by said peripheral address register for counting blocks of data transferred to or from said peripheral terminal unit.

9. The peripheral controller of claim 1 wherein said interface control block means includes:
(a) direct memory access logic means for transferring data via complete 512 word blocks between said selected peripheral terminal unit and said segmented buffer memory without need to use said peripheral address register (P).

10. A peripheral controller for executing data transfer Read and Write operations between a host computer and a plurality of peripheral terminal units wherein said host computer generates data transfer I/O instructions, designating a particular peripheral terminal unit and the number of words to be read or written, to said peripheral controller to communicate with a specified peripheral terminal unit to initiate data transfer operations to/from said host computer via a buffer memory means having private dedicated page segments for each peripheral terminal unit, said peripheral controller comprising, in combination:
(a) first means for transferring data between said host computer and a designated page segment of said buffer memory means, said first means including:
 (a1) first bus connection means between said host computer and said buffer memory means;
 (a2) said buffer memory means including:
  (a2a) a plurality of page segments each one of which is associated with and dedicated to a separate peripheral terminal unit;
  (a2b) a unit queue segment means which includes:
   (a2b1) a plurality of sets of unit queue scratchpad areas including one set for each associated peripheral terminal unit, each set including:
    (i) current I/O instruction data for its associated peripheral terminal unit;
    (ii) I/O status information data for directing an arithmetic logic unit (ALU) processor means to initiate an I/O instruction for a data transfer operation or to resume the continuance of a previously initiated data transfer operation;
    (iii) a system pointer/return address for placement, by said ALU processor means, in a System Address Register indicating which buffer memory means location should next be accessed in the associated page segment;
    (iv) a peripheral pointer/return address for placement by said ALU processor means in a Peripheral Address Register indicating which buffer memory means location should next be accessed in the associated page segment;
 (a3) address bus connection means from a three port memory address means to said buffer memory means;
(b) second means for controlling and executing data transfers between designated peripheral terminal units and said buffer memory means on the basis of selecting those peripheral terminal units which are immediately ready to receive data (write) or ready to transmit data (read), said second means including:
 (b1) said ALU processor means for selecting and executing I/O instructions on those peripheral terminal units immediately ready to accept (write) or to transmit (read) data;
 (b2) said three port memory address means for accessing page segment and word locations in said buffer memory means, said three port address means including:
  (b2a) said System (S) Address Register for addressing page segment and word locations in said buffer memory means during host-buffer and buffer-host data transfers;
  (b2b) said Peripheral (P) Address Register for addressing page segment and word locations in said buffer memory means during buffer-peripheral and peripheral-buffer data transfers;
  (b2c) a Scratch Pad (SPAD) Address Register for addressing said pointer/return address in said queue means for a particular peripheral unit and for conveying said pointer/return address data to said P address register or said S address register thus allowing any incomplete data transfer instruction operation to be accurately completed.

(c) third means for controlling connection to and disconnection from each one of said plurality of peripheral terminal units, said third means including:
  (c1) interface bus means connecting a protocol controller to said plurality of peripheral terminal units;
  (c2) said protocol controller for controlling the conditions of use of said interface bus means;
  (c3) internal bus means connecting said protocol controller with said buffer memory means.

11. A peripheral controller for executing data transfer operations between a host computer and a plurality of peripheral terminal units wherein said host computer generates I/O data transfer instructions to said peripheral controller to communicate with a selected peripheral terminal unit to initiate data transfer operations to/from said host computer via a buffer memory means having a dedicated page segment for each associated peripheral terminal unit, said peripheral controller comprising:
(a) means for communication between said host computer and said buffer memory means said means including:
  (a1) said buffer memory means including:
    (a1a) a plurality of page segments each one of which is associated with and dedicated to a particular one of said peripheral terminal units;
    (a1b) a unit queues area providing a plurality of dedicated scratch pad areas, each one of which is associated with a particular one of said page segments and peripheral terminal units and providing stored data on I/O instructions, on initial/return pointer addresses for each page segment, and on I/O cycle status information;
  (a2) host bus means connecting said host computer to said buffer memory means;
(b) execution means for executing and controlling data transfers between selected peripheral terminal units and said host computer via said buffer memory means, said execution means including:
  (b1) arithmetic logic unit (ALU) processor means for sequentially selecting I/O instructions received and stored in said unit queues are and initiating data transfers between host computer—buffer memory means or peripheral terminal—buffer memory means, said sequential selection and initiation of I/O instructions being operated to permit multiple numbers of data transfer instructions to be operating concurrently in a fashion which obviates delays in data accessibility so that immediately available data is given priority of transfer;
  (b2) triple port address means controlled by said ALU processor means, said address means including:
    (b2a) a system (S) address register for use in addressing said buffer memory means in executing host computer—buffer memory means data transfers;
    (b2b) a peripheral (P) address register for use in addressing said buffer memory means in executing peripheral unit—buffer memory means data transfers;
    (b2c) a scratch pad (SPAD) address register for addressing selected unit queues scratchpad areas to provide addresses to said system/peripheral address registers to enable initiation of data transfers or completion of previously initiated data transfer instructions;
(c) interface means for connecting said buffer memory means to each of said plurality of peripheral terminal units, said interface means including:
  (c1) interface bus means connecting each said peripheral terminal unit to an interface controller means;
  (c2) said interface controller means for controlling operation of said interface bus means;
  (c3) internal bus means connecting said interface controller means to said buffer memory means.

* * * * *